Oct. 5, 1943.  W. S. ACUFF, JR  2,330,941
INSULATION
Filed Feb. 23, 1940
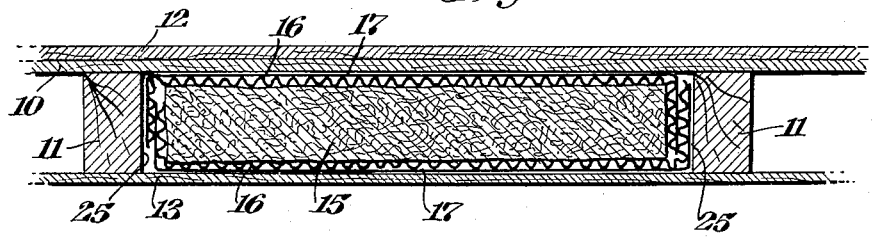
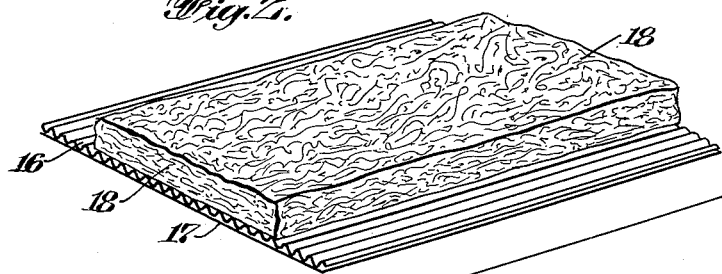
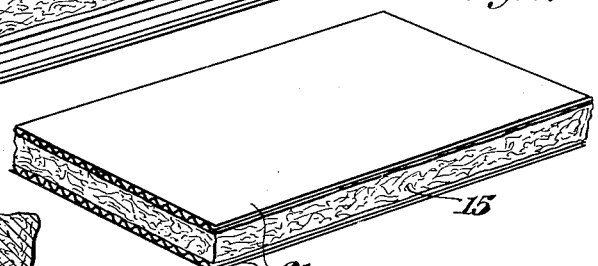
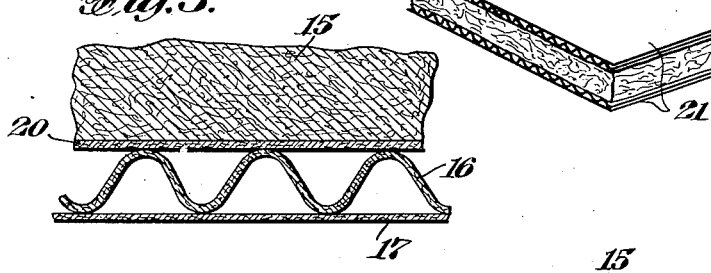
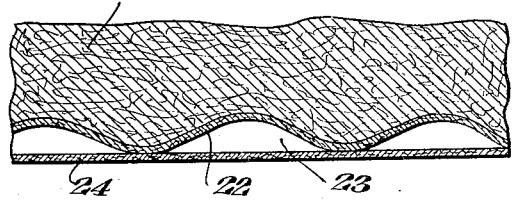
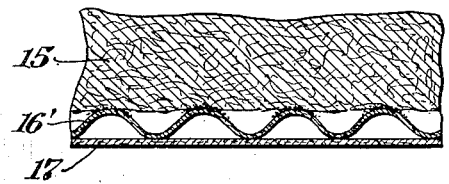
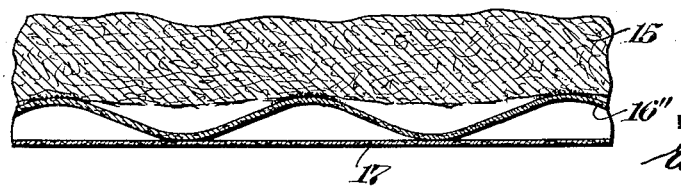
INVENTOR
William S. Acuff Jr.
BY
Edwards Bruer & Pool
ATTORNEYS Patented Oct. 5, 1943

2,330,941

UNITED STATES PATENT OFFICE 2,330,941

INSULATION

William Scheetz Acuff, Jr., Horsham Township, Montgomery County, Pa., assignor to Keasbey & Mattison Company, Ambler, Pa., a corporation of Pennsylvania Application February 23, 1940, Serial No. 320,249

3 Claims. (Cl. 20—4)

This invention relates to an insulating structure using rock wool, slag wool, fibrous glass and the like for heat insulation of dwellings and other buildings.

The object of the invention is to provide an insulating structure of this type which will be self-protective against the accumulation of moisture by condensation under changes of temperature and weather.

It is well recognized by the industry that under certain conditions of temperature and humidity, which may occur particularly during colder seasons, condensation may, and often does, occur within the walls of a building having insulated walls. This condensation in the form of liquid moisture or ice occurs within the insulation of the walls of the building. The condensed moisture usually originating within the building, although it may also come from other sources, may then percolate away from the point of condensation within the walls to reappear elsewhere causing staining of the walls, corrosion of metal used in the structure, interference with electrical circuits, etc.

I have found that this accumulation of condensation may be overcome by air channels distributed along the surface of the sheet or batt of the insulating material and providing for circulation of air along said surfaces. This will prevent or reduce condensation and maintain a high degree of heat insulation.

The invention is shown in connection with specific embodiments thereof illustrated in the accompanying drawing, in which Fig. 1 is a horizontal sectional view of a building structure with an insulating unit inserted between the inner and outer walls;

Fig. 2 is a perspective view of an insulating unit in course of assembly;

Fig. 3 is a partial transverse sectional view illustrating a modified form of ventilation for an insulation; Figs. 4 and 5 are similar views of further modifications;

Fig. 6 is a perspective view of a modified insulating unit in assembled form, and Fig. 7 is a partial transverse sectional view of of a further modification of the surface contour of the insulating material to provide the ventilating channels.

In the structure shown in Fig. 1, an outer wall 10 is separated by the studs 11 from the inner wall 13 and has a facing 12 of shingles or siding. In the space between the outer and inner walls and the studs 11 is the fibrous insulating material 15 of slag wool or the like having a surface layer of corrugated sheeting 16. This corrugated sheeting may be of paper of any desired composition of asbestos, pulp or the like sufficiently stiff to hold its corrugated form during handling, insertion and use. Preferably, the tops of the corrugations contacting the sheet or batt of insulation 15 will be cemented to the surface of the insulation firmly to secure the parts together, and the corrugated sheet will usually be provided with an outer uncorrugated paper sheet 17 cemented to the opposite crests of the corrugations.

The corrugated sheets 16 may be applied to the insulation to form the units at the factory, or they may be assembled and applied at the building, and the ends of the corrugations may be folded over and overlapped and cemented in place as shown in Fig. 1, to complete the enclosure of the insulating material within the outer layers. If desired, the corrugated sheeting may be applied to only a portion of the insulating sheet or batt, for instance, to one side thereof.

In one form of manufacture illustrated in Fig. 2, one half of the insulating material is cemented in place on a corrugated sheet 16, 17 cut to corresponding length, and two of these assemblies similarly formed are united together by binding the batts face to face and then folding over the ends of the corrugated sheets in overlapping relation as shown in Fig. 1.

As illustrated in Fig. 3, the corrugated sheet may have a backing sheet 17, 20 on each side, the surface of the backing sheet 20 being cemented to the surface of the fibrous insulating material. Normally, the corrugations will be at least one quarter of an inch high in order to obtain a satisfactory degree of air circulation. Kraft paper has been found satisfactory, and a moisture-resistant corrugated sheet is an improvement over an ordinary sheet in that the water-proofing treatment tends to prevent the passage of moisture through the corrugated sheet to a greater extent. The corrugations may be of any desired shape and frequence, as indicated by variations shown at 16', 16" in Figs. 4 and 5, and Fig. 6 illustrates an insulating unit employing foil surfaced corrugated board 21 on each side of the batt 15.

In Fig. 7 the surface of the insulating material itself is stiffened and corrugated as indicated at 22 to provide air spaces 23 between the insulation and the adjacent surface 24. This corrugation of the insulating material may be attained by impregnating the surface with a cementing means, such as silicate of soda, and pressing the surface to undulated shape and permitting the cementing means to harden in this condition.

Instead of combining the corrugated sheet as a container for the sheet or batt of insulating material, the former may be applied to the building walls next to the exterior and interior sides of the insulating batt, for instance at the time of construction providing a building structure in which corrugated or hollow sheets are attached between the studs to the inside or outside wall members or to both inside and outside members and the hollow between filled with a loose insulation such as nodulated rock wool, expanded Vermiculite or other loose type of insulations. Thus the corrugated sheet may be attached to the inside of the exterior wall 10 (Fig. 1) by tacking it lightly thereto. Then after positioning the batt in place against the tacked sheet, similar corrugated sheets may be attached to the interior side of the batts by laying properly sized corrugated sheets upon the batts or by tacking properly sized sheets to the sides of the studs 11 (Fig. 1) or by tacking such corrugated sheets over the interior surfaces 25 of the studs 11 before applying the interior wall 13, such as usual metal lath for plaster finish.

Whether the corrugated sheets are applied directly to the insulating batts before assembling in the building, or whether such sheets are made a portion of the structure on the job, the general results will be the same, i. e., a circulation of air will be maintained which will reduce the infiltration of moist air into the insulation itself.

The insulation of rock wool, slag wool, fibrous glass, or other fibrous material, will be improved in strength and handling properties by the surrounding paper sheeting. This paper sheeting may be corrugated as shown with parallel ridges similarly sized to one quarter of an inch or over, or the air spaces may be provided by any other corrugating shape or other hollow formation giving circulating air spaces around the mat or batt of insulating material. Such paper construction will in addition possess heat and sound insulating properties of its own added to those of the batt proper, and in addition to the cementing of the sheet to the fibrous insulation, may be impregnated or laquered or otherwise stiffened for structural strength.

Preferably the circulating currents of air will run vertically, thus permitting effective use of the natural drafts within the structure, but secondary or induced currents in any direction will be similarly effective. The important consideration is to provide continuous free air spaces around the fibrous insulating material so that currents of air therein will intervene to carry off moisture and so reduce the infiltration of this moisture into the fibrous material of the insulation itself.

The term "sheet" when applied to the insulating material is intended to include any form of the material spread or retained between generally parallel surfaces, as for instance the slag wool or rock wool batts commonly used in insulating structures.

I claim:

1. A building structure comprising spaced walls and stud members and a number of separate insulating units vertically positioned in the spaces between said members, each of said units comprising a mass of fibrous insulation and vertically extending corrugated sheeting surrounding said mass and enclosing it on all sides and shaped with a series of parallel ridge portions forming continuous vertically extending open ended air channels at least ¼" in depth along the surface of said sheeting and communicating with the interstices of said insulation and extending around the entire circumference of the mass and providing for air circulation from end to end of the insulation sufficient to protect the mass against the infiltration of moisture both from the inside and outside.

2. A building structure comprising spaced wall and stud members and a number of separate insulating units positioned in the spaces between said members, each of said units comprising a loosely formed porous mass of particles of insulation and corrugated sheeting around said mass and shaped with a series of parallel ridge portions with their crests contacting the surface of the insulating mass along separated parallel lines leaving open ended air channels between them in direct communication with the interstices of the insulation so as to provide circulation of air directly along the surface of said insulation from end to end thereof.

3. A building structure as set forth in claim 2 in which the surface of the insulating mass is impregnated with a stiffening material and the crests of the corrugations are fastened to said surface stiffened.

WILLIAM SCHEETZ ACUFF, Jr.